US008395486B2

(12) United States Patent
Sajadi et al.

(10) Patent No.: US 8,395,486 B2
(45) Date of Patent: Mar. 12, 2013

(54) SYSTEM AND METHOD FOR INTERACTIVE USER-DIRECTED INTERFACING BETWEEN HANDHELD DEVICES AND RFID MEDIA

(75) Inventors: Ali M. Sajadi, Washington, DC (US); Mohamad Reza M. Sajadi, Hunt Valley, MD (US); David Carrott, Bristow, VA (US)

(73) Assignee: Q Street, LLC, Washington, DC (US)

( * ) Notice: Subject to any disclaimer, the term of this patent is extended or adjusted under 35 U.S.C. 154(b) by 0 days.

(21) Appl. No.: 13/239,685

(22) Filed: Sep. 22, 2011

(65) Prior Publication Data
US 2012/0050018 A1 Mar. 1, 2012

Related U.S. Application Data

(63) Continuation of application No. 12/901,430, filed on Oct. 8, 2010, now Pat. No. 8,068,011.

(51) Int. Cl.
*H04Q 5/22* (2006.01)

(52) U.S. Cl. .................. 340/10.4; 340/572.4; 340/13.26

(58) Field of Classification Search ................. 340/10.1, 340/572.1, 5.93, 10.4, 572.4, 13.26
See application file for complete search history.

(56) References Cited

U.S. PATENT DOCUMENTS

| 4,688,026 A * | 8/1987 | Scribner et al. ............... 235/385 |
| 5,628,204 A | 5/1997 | Shanaberger |
| 5,732,401 A | 3/1998 | Conway |
| 5,837,983 A | 11/1998 | Actis et al. |
| 5,886,634 A * | 3/1999 | Muhme ...................... 340/572.1 |
| 5,938,726 A * | 8/1999 | Reber et al. .................. 709/217 |
| 6,285,282 B1 * | 9/2001 | Dorenbosch et al. ......... 340/540 |
| 6,297,727 B1 | 10/2001 | Nelson, Jr. |
| 6,327,576 B1 * | 12/2001 | Ogasawara ..................... 705/22 |
| 6,545,614 B1 | 4/2003 | Kasai |
| 6,563,430 B1 | 5/2003 | Kemink |
| 6,609,656 B1 * | 8/2003 | Elledge ......................... 235/382 |
| 6,671,646 B2 * | 12/2003 | Manegold et al. ............ 702/127 |
| 6,677,852 B1 * | 1/2004 | Landt ........................... 340/10.1 |
| 6,693,539 B2 * | 2/2004 | Bowers et al. .............. 340/572.1 |
| 6,783,060 B2 | 8/2004 | Marappan |
| 6,993,393 B2 | 1/2006 | Von Arx et al. |
| 7,047,159 B2 | 5/2006 | Muehl et al. |
| 7,060,030 B2 | 6/2006 | Von Arx et al. |
| 7,076,255 B2 | 7/2006 | Parupudi et al. |
| 7,119,659 B2 | 10/2006 | Bonalle et al. |
| 7,128,274 B2 | 10/2006 | Kelley et al. |
| 7,155,305 B2 | 12/2006 | Hayes et al. |
| 7,172,112 B2 | 2/2007 | Bonalle et al. |
| 7,178,729 B2 * | 2/2007 | Shaffer et al. ................. 235/385 |
| 7,180,422 B2 | 2/2007 | Milenkovic et al. |

(Continued)

FOREIGN PATENT DOCUMENTS

| EA | 1575183 A1 | 9/2005 |
| EP | 1314299 B1 | 11/2004 |

(Continued)

*Primary Examiner* — Jennifer Mehmood
*Assistant Examiner* — Rufus Point
(74) *Attorney, Agent, or Firm* — Andrews Kurth LLP

(57) ABSTRACT

Systems and methods for interactively interfacing handheld devices and RFID media are described. A method for interactively interfacing HHDs and RFID media. The method includes starting an application on a HHD for interfacing with RFID media, the HHD including a RFID reader, receiving user input relating to the storing of commands or messages of RFID media, creating one or more commands or messages based on the received user input, and storing the one or more commands or messages on a RFID media using the RFID reader.

28 Claims, 5 Drawing Sheets

U.S. PATENT DOCUMENTS

| | | | |
|---|---|---|---|
| 7,194,278 B1 | 3/2007 | Cook | |
| 7,213,766 B2 | 5/2007 | Ryan et al. | |
| 7,215,978 B2 * | 5/2007 | Hasegawa | 455/558 |
| 7,248,834 B2 * | 7/2007 | Matsuo et al. | 455/41.2 |
| 7,268,667 B2 | 9/2007 | Beenau et al. | |
| 7,346,061 B2 * | 3/2008 | Takayama et al. | 370/395.4 |
| 7,409,231 B2 * | 8/2008 | Oba et al. | 455/566 |
| 7,440,743 B2 * | 10/2008 | Hara et al. | 455/343.2 |
| 7,471,200 B2 * | 12/2008 | Otranen | 340/572.1 |
| 7,522,879 B2 * | 4/2009 | Matsuo et al. | 455/41.1 |
| 7,541,930 B2 * | 6/2009 | Saarisalo et al. | 340/572.7 |
| 7,551,930 B2 * | 6/2009 | Lempio et al. | 455/456.3 |
| 7,586,398 B2 * | 9/2009 | Huang et al. | 340/10.5 |
| 7,606,533 B2 * | 10/2009 | Perttila et al. | 455/41.2 |
| 7,616,095 B2 * | 11/2009 | Jones et al. | 340/10.5 |
| 7,640,271 B2 * | 12/2009 | Logan, Jr. | 1/1 |
| 7,680,691 B2 * | 3/2010 | Kimball et al. | 705/22 |
| 7,683,781 B2 * | 3/2010 | Kantrowitz et al. | 340/572.1 |
| 7,756,467 B2 * | 7/2010 | Bent et al. | 455/3.04 |
| 7,880,616 B2 * | 2/2011 | Kanagala et al. | 340/572.1 |
| 8,068,011 B1 * | 11/2011 | Sajadi et al. | 340/10.4 |
| 2004/0228460 A1 * | 11/2004 | Keramane | 379/110.01 |
| 2006/0145815 A1 * | 7/2006 | Lanzieri et al. | 340/10.2 |
| 2006/0202803 A1 | 9/2006 | Yoon | |
| 2007/0067325 A1 | 3/2007 | Weitzner | |
| 2008/0057876 A1 * | 3/2008 | Hsia et al. | 455/69 |
| 2010/0099354 A1 * | 4/2010 | Johnson | 455/41.1 |
| 2010/0280918 A1 * | 11/2010 | Balent | 705/26 |

FOREIGN PATENT DOCUMENTS

| | | |
|---|---|---|
| EP | 1501038 A1 | 1/2005 |
| EP | 1569386 A2 | 6/2005 |
| EP | 1569386 A2 | 8/2005 |
| EP | 1575183 A1 | 9/2005 |
| EP | 1717963 A1 | 11/2005 |
| EP | 1630712 A1 | 3/2006 |
| EP | 1653632 | 5/2006 |
| EP | 1653632 A1 | 5/2006 |
| EP | 1657944 A1 | 5/2006 |
| EP | 1681778 A2 | 7/2006 |
| EP | 1954008 A2 | 8/2006 |
| EP | 1708405 A1 | 10/2006 |
| EP | 1717963 A1 | 11/2006 |
| EP | 1722310 A1 | 11/2006 |
| EP | 1752915 A2 | 2/2007 |
| EP | 1773080 A2 | 4/2007 |
| EP | 1793531 A1 | 6/2007 |
| EP | 1804475 A2 | 7/2007 |
| EP | 1809056 A2 | 7/2007 |
| EP | 1814239 A2 | 8/2007 |
| EP | 1645694 A1 | 10/2007 |
| EP | 1841178 A1 | 10/2007 |
| EP | 1845632 A1 | 10/2007 |
| EP | 1845694 A1 | 10/2007 |
| EP | 1855230 A2 | 11/2007 |
| EP | 1855483 A2 | 11/2007 |
| EP | 1860586 A1 | 11/2007 |
| EP | 1871135 A2 | 12/2007 |
| EP | 1867459 A2 | 2/2008 |
| EP | 1887460 A2 | 2/2008 |
| EP | 1895443 A2 | 3/2008 |
| EP | 1901086 A2 | 3/2008 |
| EP | 1901203 A1 | 3/2008 |
| EP | 1912180 A2 | 4/2008 |
| EP | 1912339 A1 | 4/2008 |
| EP | 1914631 A1 | 4/2008 |
| EP | 1914831 A1 | 4/2008 |
| EP | 1916810 A1 | 4/2008 |
| EP | 1954008 A2 | 8/2008 |
| EP | 1959332 A1 | 8/2008 |
| EP | 1959619 A2 | 8/2008 |
| EP | 1959819 A2 | 8/2008 |
| EP | 1958266 A1 | 9/2008 |
| EP | 1965522 A2 | 9/2008 |
| EP | 1968266 A1 | 9/2008 |
| EP | 1976055 A1 | 10/2008 |
| EP | 1976665 A2 | 10/2008 |
| EP | 1978565 A2 | 10/2008 |
| EP | 1983491 A1 | 10/2008 |
| EP | 1986340 | 10/2008 |
| EP | 1986340 A2 | 10/2008 |
| EP | 1986395 A1 | 10/2008 |
| EP | 1895668 A1 | 11/2008 |
| EP | 1990942 A2 | 11/2008 |
| EP | 1995668 A1 | 11/2008 |
| EP | 2003573 A1 | 12/2008 |
| EP | 2018000 A1 | 1/2009 |
| EP | 2018017 A2 | 1/2009 |
| EP | 2023675 A2 | 2/2009 |
| EP | 2034428 | 3/2009 |
| EP | 2034428 A1 | 3/2009 |
| EP | 2043070 A1 | 4/2009 |
| EP | 2051179 A1 | 4/2009 |
| EP | 2055246 A1 | 5/2009 |
| EP | 2056246 A1 | 5/2009 |
| EP | 2056261 A1 | 5/2009 |
| EP | 2065728 A1 | 5/2009 |
| EP | 2073183 A1 | 6/2009 |
| EP | 2075921 A2 | 7/2009 |
| EP | 2077518 A1 | 7/2009 |
| EP | 2077652 A2 | 7/2009 |
| EP | 2088748 A1 | 8/2009 |
| EP | 1897231 | 9/2009 |
| EP | 1897231 B1 | 9/2009 |
| EP | 2009139 A2 | 9/2009 |
| EP | 2077652 A2 | 9/2009 |
| EP | 2096591 | 9/2009 |
| EP | 2098955 A1 | 9/2009 |
| EP | 2104049 A1 | 9/2009 |
| EP | 2105904 A1 | 9/2009 |
| EP | 2106107 A1 | 9/2009 |
| EP | 2106108 A1 | 9/2009 |
| EP | 1767139 B1 | 10/2009 |
| EP | 1787139 B1 | 10/2009 |
| EP | 2063376 A3 | 11/2009 |
| EP | 2120109 A2 | 11/2009 |
| EP | 2120111 A2 | 11/2009 |
| EP | 2120113 A2 | 11/2009 |
| EP | 2120114 A2 | 11/2009 |
| EP | 2120115 A2 | 11/2009 |
| EP | 2120116 A1 | 11/2009 |
| EP | 2124146 A1 | 11/2009 |
| EP | 2128830 A1 | 12/2009 |
| EP | 2161630 A2 | 3/2010 |
| EP | 2161901 A1 | 3/2010 |
| EP | 2164014 A1 | 3/2010 |
| EP | 2169924 A1 | 3/2010 |
| EP | 21640114 A1 | 3/2010 |
| EP | 1829303 B1 | 4/2010 |
| EP | 2173135 A2 | 4/2010 |
| EP | 2180390 A2 | 4/2010 |
| EP | 2182810 A2 | 6/2010 |
| EP | 2192753 A1 | 6/2010 |
| EP | 2192810 A2 | 6/2010 |
| EP | 2194472 A1 | 6/2010 |
| EP | 2196968 A1 | 6/2010 |
| EP | 2199996 | 6/2010 |
| EP | 2199996 A1 | 6/2010 |
| EP | 2207108 A1 | 7/2010 |
| EP | 1975231 A1 | 10/2010 |
| EP | 1990942 | 11/2011 |
| JP | 2004200840 | 7/2004 |
| JP | 2004215225 | 7/2004 |
| JP | 2004334453 | 11/2004 |
| JP | 2005045557 | 2/2005 |
| JP | 20050045557 | 2/2005 |
| JP | 2005158069 | 6/2005 |
| JP | 2005168069 | 6/2005 |
| JP | 3595466 | 7/2005 |
| JP | 3695463 | 7/2005 |
| JP | 3695465 | 7/2005 |
| JP | 3695466 | 7/2005 |
| JP | 2005204331 | 7/2005 |
| JP | 2005210741 | 8/2005 |
| JP | 2005218127 | 8/2005 |
| JP | 2005159958 | 11/2005 |

| | | | | | |
|---|---|---|---|---|---|
| JP | 2005332018 | 12/2005 | WO | WO/2007/101992 A1 | 9/2007 |
| JP | 2006074767 | 3/2006 | WO | WO/2007/104365 A1 | 9/2007 |
| JP | 200621339 | 5/2006 | WO | WO/2007/112787 A1 | 10/2007 |
| JP | 2006121339 | 5/2006 | WO | WO/2007/12179 A1 | 11/2007 |
| JP | 2006211519 | 8/2006 | WO | WO/2007/121791 A1 | 11/2007 |
| JP | 2007061621 | 3/2007 | WO | WO/2007/122438 | 11/2007 |
| JP | 2007081551 | 3/2007 | WO | WO/2007/122439 A1 | 11/2007 |
| JP | 2007081621 | 3/2007 | WO | WO/2007/124932 A2 | 11/2007 |
| JP | 2007150984 | 6/2007 | WO | WO/2007/124965 A1 | 11/2007 |
| JP | 2008134735 | 6/2008 | WO | WO/2007/127559 A2 | 11/2007 |
| JP | 2008165791 | 7/2008 | WO | WO/2007/129139 A1 | 11/2007 |
| JP | 2008252362 | 10/2008 | WO | WO/2007/146470 A2 | 12/2007 |
| JP | 2008252883 | 10/2008 | WO | WO/2007/147448 A1 | 12/2007 |
| JP | 2008259200 | 10/2008 | WO | WO/2008/005460 A2 | 1/2008 |
| JP | 2008262362 | 10/2008 | WO | WO/2008/005974 A2 | 1/2008 |
| JP | 2008294976 | 12/2008 | WO | WO/2008/007260 A1 | 1/2008 |
| JP | 2009036774 | 2/2009 | WO | WO/2008/009654 A2 | 1/2008 |
| JP | 2009038774 | 2/2009 | WO | WO/2008/014800 A1 | 2/2008 |
| JP | 2009064316 | 3/2009 | WO | WO/2008/021032 A2 | 2/2008 |
| JP | 2009100074 | 5/2009 | WO | WO/2005/031629 A1 | 3/2008 |
| JP | 2009134393 | 6/2009 | WO | WO/2008/02762 A1 | 3/2008 |
| JP | 2009147845 | 7/2009 | WO | WO/2008/026691 A1 | 3/2008 |
| JP | 2009182902 | 8/2009 | WO | WO/2008/026891 A1 | 3/2008 |
| JP | 2009236225 | 10/2009 | WO | WO/2008/027620 A1 | 3/2008 |
| JP | 2009237974 | 10/2009 | WO | WO/2008/027621 A1 | 3/2008 |
| JP | 2009238225 | 10/2009 | WO | WO/2008/031629 A1 | 3/2008 |
| JP | 2009239431 | 10/2009 | WO | WO/2008/033898 A2 | 3/2008 |
| JP | 2009239567 | 10/2009 | WO | WO/2008/034937 A1 | 3/2008 |
| JP | 20092329567 | 10/2009 | WO | WO/2008/039234 A1 | 4/2008 |
| JP | 2009260666 | 11/2009 | WO | WO/2008/039434 A1 | 4/2008 |
| JP | 2009290869 | 12/2009 | WO | WO/2008/039559 A1 | 4/2008 |
| JP | 20092920869 | 12/2009 | WO | WO/2008/039560 A1 | 4/2008 |
| JP | 2010011418 | 1/2010 | WO | WO/2008/042302 A2 | 4/2008 |
| JP | 2010011419 | 1/2010 | WO | WO/2008/042455 A1 | 4/2008 |
| JP | 2010011420 | 1/2010 | WO | WO/2008/045586 A1 | 4/2008 |
| JP | 2010020453 | 1/2010 | WO | WO/2008/048376 A1 | 4/2008 |
| JP | 201049645 | 3/2010 | WO | WO/2008/065232 A1 | 6/2008 |
| JP | 2010049645 | 3/2010 | WO | WO/2008/067153 A2 | 6/2008 |
| JP | 2010055603 | 3/2010 | WO | WO/2008/062851 A1 | 7/2008 |
| JP | 2010056593 | 3/2010 | WO | WO/2008/082851 A1 | 7/2008 |
| JP | 2010068106 | 3/2010 | WO | WO/2008/087431 A1 | 7/2008 |
| JP | 2009173757 | 2/2011 | WO | WO/2008/087739 A1 | 7/2008 |
| WO | WO/98/48396 | 10/1998 | WO | WO/2008/098082 A2 | 8/2008 |
| WO | WO/01/13217 A1 | 2/2001 | WO | WO/2008/103675 A1 | 8/2008 |
| WO | WO/2004/077345 A1 | 9/2004 | WO | WO/2008/103871 A1 | 8/2008 |
| WO | WO2005091997 A2 | 10/2005 | WO | WO/2008/103875 A1 | 8/2008 |
| WO | WO/2006/023857 A1 | 3/2006 | WO | WO/2008/103945 A1 | 8/2008 |
| WO | WO/2006/027725 A1 | 3/2006 | WO | WO/2008/103988 A2 | 8/2008 |
| WO | WO/2006/035331 A1 | 4/2006 | WO | WO/2008/103991 A2 | 8/2008 |
| WO | WO/2006/053677 A1 | 5/2006 | WO | WO/2008/113053 A1 | 9/2008 |
| WO | WO/2008/067153 A2 | 6/2006 | WO | WO/2008/127967 A3 | 10/2008 |
| WO | WO/2006/085269 A1 | 8/2006 | WO | WO/2008/128583 A1 | 10/2008 |
| WO | WO/2006/086729 A1 | 8/2006 | WO | WO2008127967 | 10/2008 |
| WO | WO/2008/103945 A1 | 8/2006 | WO | WO/2008/147457 A1 | 12/2008 |
| WO | WO/2006/095212 A1 | 9/2006 | WO | WO/2008/147728 A1 | 12/2008 |
| WO | WO/2006/097760 A1 | 9/2006 | WO | WO/2008/152739 A1 | 12/2008 |
| WO | WO/2006/100171 A1 | 9/2006 | WO | WO/2009/002972 A2 | 12/2008 |
| WO | WO/2006/102537 A2 | 9/2006 | WO | WO/2009/003707 A1 | 1/2009 |
| WO | WO/2006/111782 A1 | 10/2006 | WO | WO/2009/013385 A1 | 1/2009 |
| WO | WO/2006/138584 A2 | 12/2006 | WO | WO/2009/018255 A2 | 2/2009 |
| WO | WO/2007/002485 A2 | 1/2007 | WO | WO/2009/021220 A1 | 2/2009 |
| WO | WO/2007/012909 A1 | 2/2007 | WO | WO/2009/026000 A1 | 2/2009 |
| WO | WO/2007/017777 A2 | 2/2007 | WO | WO/2009/036264 A1 | 3/2009 |
| WO | WO/2007/020519 A1 | 2/2007 | WO | WO/2009/039419 A1 | 3/2009 |
| WO | WO/2007/034457 A1 | 3/2007 | WO | WO/2009/045085 A1 | 4/2009 |
| WO | WO/2007/037841 A2 | 4/2007 | WO | WO/2009/057745 A1 | 5/2009 |
| WO | WO/2007/046653 A1 | 4/2007 | WO | WO/2009/058010 A1 | 5/2009 |
| WO | WO2007046653 | 4/2007 | WO | WO/2009/058494 A1 | 5/2009 |
| WO | WO/2007/048399 A1 | 5/2007 | WO | WO/2009/059213 A2 | 5/2009 |
| WO | WO/2007/052117 A1 | 5/2007 | WO | WO/2009/062175 A2 | 5/2009 |
| WO | WO/2007/060616 A2 | 5/2007 | WO | WO/2009/062176 A2 | 5/2009 |
| WO | WO/2007/068993 A1 | 6/2007 | WO | WO/2009/063121 A1 | 5/2009 |
| WO | WO/2007/076455 A2 | 7/2007 | WO | WO/2009/064522 A1 | 5/2009 |
| WO | WO/2007/076456 A2 | 7/2007 | WO | WO/2009/069971 A2 | 6/2009 |
| WO | WO/2007/082504 A1 | 7/2007 | WO | WO/2009/069989 A2 | 6/2009 |
| WO | WO/2007/082602 A1 | 7/2007 | WO | WO/2009/69989 A2 | 6/2009 |
| WO | WO/2007/082604 A1 | 7/2007 | WO | WO/2009/071734 A1 | 6/2009 |
| WO | WO/2007/082612 A1 | 7/2007 | WO | WO/2009/076030 A2 | 6/2009 |
| WO | WO/2007/099639 A1 | 9/2007 | WO | WO/2009/079330 A1 | 6/2009 |

| | | | | | | |
|---|---|---|---|---|---|---|
| WO | WO/2009/079385 A1 | 6/2009 | | WO | WO/2010/0115055 A3 | 1/2010 |
| WO | WO/2009/081337 A1 | 7/2009 | | WO | WO/2010/012129 A1 | 2/2010 |
| WO | WO/2009/09864 A1 | 8/2009 | | WO | WO/2010/015995 A1 | 2/2010 |
| WO | WO/2009/095048 A1 | 8/2009 | | WO | WO/2010/016486 A1 | 2/2010 |
| WO | WO/2009/097215 A1 | 8/2009 | | WO | WO/2010/017237 A2 | 2/2010 |
| WO | WO/2009/098646 A1 | 8/2009 | | WO | WO/2010/018483 A1 | 2/2010 |
| WO | WO/2009/101534 A1 | 8/2009 | | WO | WO/2010/018486 A1 | 2/2010 |
| WO | WO/2009/105115 A1 | 8/2009 | | WO | WO/2010/019668 A3 | 2/2010 |
| WO | WO/2009/105115 A2 | 8/2009 | | WO | WO/2010/022642 A1 | 3/2010 |
| WO | WO/2009/111419 A2 | 9/2009 | | WO | WO/2010/023298 A3 | 3/2010 |
| WO | WO/2009/115115 A1 | 9/2009 | | WO | WO/2010/025157 A1 | 3/2010 |
| WO | WO/2009/13079 A1 | 10/2009 | | WO | WO/2010/029446 A1 | 3/2010 |
| WO | WO/2009/124790 A1 | 10/2009 | | WO | WO/2010/030403 A1 | 3/2010 |
| WO | WO/2009/127267 A1 | 10/2009 | | WO | WO/2010/030415 A1 | 3/2010 |
| WO | WO/2009/128032 A1 | 10/2009 | | WO | WO/2010/033967 A1 | 3/2010 |
| WO | WO/2009/130796 A1 | 10/2009 | | WO | WO2010/033968 A1 | 3/2010 |
| WO | WO/2009/0138554 A1 | 11/2009 | | WO | WO/2010/035256 A2 | 4/2010 |
| WO | WO/2009/138554 A1 | 11/2009 | | WO | WO/2010/037218 A1 | 4/2010 |
| WO | WO2009/138559 A1 | 11/2009 | | WO | WO/2010/042560 A2 | 4/2010 |
| WO | WO/2009/141751 A1 | 11/2009 | | WO | WO/2010/042977 A1 | 4/2010 |
| WO | WO/2009/141773 A2 | 11/2009 | | WO | WO/2010/044912 A1 | 4/2010 |
| WO | WO/2009/141805 A3 | 11/2009 | | WO | WO/2010/047849 A1 | 4/2010 |
| WO | WO/2009/173757 A1 | 11/2009 | | WO | WO/2010/057390 A1 | 5/2010 |
| WO | WO2009138554 | 11/2009 | | WO | WO/2010/060118 A2 | 5/2010 |
| WO | WO2009138559 | 11/2009 | | WO | WO/2010/062077 A2 | 6/2010 |
| WO | WO/2009/002972 A2 | 12/2009 | | WO | WO/2010/067222 A2 | 6/2010 |
| WO | WO/2009/148289 A2 | 12/2009 | | WO | WO/2010/068053 A2 | 6/2010 |
| WO | WO/2009/151833 A1 | 12/2009 | | WO | WO/2010/068063 A2 | 6/2010 |
| WO | WO/2009/152833 A1 | 12/2009 | | WO | WO/2010/070539 A1 | 6/2010 |
| WO | WO/2009/158569 A3 | 12/2009 | | WO | WO/2010/073732 A1 | 7/2010 |
| WO | WO/2010/000462 A1 | 1/2010 | | WO | WO/2010/078616 A1 | 7/2010 |
| WO | WO/2010/002497 A1 | 1/2010 | | WO | WO/2009/141751 A1 | 11/2011 |
| WO | WO/2010/005228 A3 | 1/2010 | | | | |
| WO | WO/2010/011670 A2 | 1/2010 | | | | |

* cited by examiner

SYSTEM AND METHOD FOR INTERACTIVE USER-DIRECTED INTERFACING BETWEEN HANDHELD DEVICES AND RFID MEDIA

CROSS-REFERENCE TO RELATED APPLICATIONS

This application is a continuation of U.S. patent application Ser. No. 12/901,430, filed Oct. 8, 2010, entitled "SYSTEM AND METHOD FOR INTERACTIVE USER-DIRECTED INTERFACING BETWEEN HANDHELD DEVICES AND RFID MEDIAS," the content of which is hereby incorporated by reference in its entirety.

BACKGROUND

Handheld devices ("HHDs"), including, for example, mobile devices, personal digital assistants, handheld computers, cameras and Smartphones, are devices that are usually hand held, often pocket-sized devices, with display screens, touch input and/or miniature keyboards. HHDs are most often used for communication purposes. HHDs are becoming ubiquitous and, for many, indispensable for daily lives and activities. As such, there has not been any way to have users be able to control specific preset functions on HHDs based on the HHDs location, or otherwise, without the skills necessary to use a software development kit (SDK) or programming tool set. In an ever more complicated world, there is a need for HHDs to function more seamlessly with their environment for the benefit of the user and for increasing the HHD's flexibility.

HHDs will become even more powerful and prevalent in the near future by being more flexible in function and in how they interact with the user's environment, thereby imparting more value to the end user. Utilizing Radio Frequency Identification (RFID) technology will enable handheld devices to achieve this flexibility and add value to the user's environment. Current HHD products available for RFIDs do not allow user directed commands or messages to be stored on the RFIDs and require interaction with a back-end server to perform functions.

SUMMARY

These and other disadvantages are overcome by a method for interactively interfacing HHDs and RFID media. The method includes starting an application on a HHD for interfacing with RFID media, the HHD including a RFID reader, receiving user input relating to the storing of commands or messages of RFID media, creating one or more commands or messages based on the received user input, and storing the one or more commands or messages on a RFID media using the RFID reader.

These and other disadvantages are also overcome by a method for interactively interfacing HHDs and RFID media. The method includes passing a HHD within range of a RFID media that includes one or more commands stored thereon, the HHD including a RFID reader, interrogating the RFID media with the RFID reader, receiving, on the HHD, the one or more commands from the RFID media, the HHD processing the one or more commands from the RFID media, and in response to the processing of the one or more commands, the HHD executing one or more functions.

These and other disadvantages are also overcome by a method for interactively interfacing handheld devices HHDs and RFID media. The method includes passing a HHD within range of a RFID media that includes one or more messages stored thereon, the HHD including a RFID reader, interrogating the RFID media with the RFID reader, receiving, on the HHD, the one or more messages from the RFID media, the HHD processing the one or more messages from the RFID media, the processing including determining if the one or more messages are intended for the HHD, and in response to the processing of the one or more messages, the HHD displaying the one or more messages.

These and other disadvantages are also overcome by a system for interactively interfacing handheld devices and RFID media. The system includes one or more RFID media capable of having commands and messages stored thereon and a HHD for interfacing with RFID media, the HHD including a RFID reader capable of reading and writing commands and messages from and to RFID media, a central application that includes instructions for receiving user input relating to storing of commands or messages of RFID media, creating one or more commands or messages based on the received input, and storing the one or more commands or messages on a RFID media.

These and other disadvantages are also overcome by a system for interactively interfacing handheld devices and RFID media. The system includes a RFID media capable of having messages stored thereon, the RFID media located on a consumable or perishable item and includes a message with information describing the consumable or perishable item, and a device capable of reading and writing messages from and to the RFID media, the device including a RFID reader capable of reading and writing messages from and to the RFID media, a processor, and a memory including a central application including instructions executable by the processor for processing messages read by the RFID reader from the RFID media, including the message with information describing the consumable or perishable item, creating a message that includes a time stamp and a unique identifier (ID) for the consumable or perishable item, and storing the created message on the RFID media on the consumable or perishable item.

BRIEF DESCRIPTION OF DRAWINGS

Embodiments are described with reference with to the following figures, in which like numerals refer to like elements.

DETAILED DESCRIPTION

Figure 1:
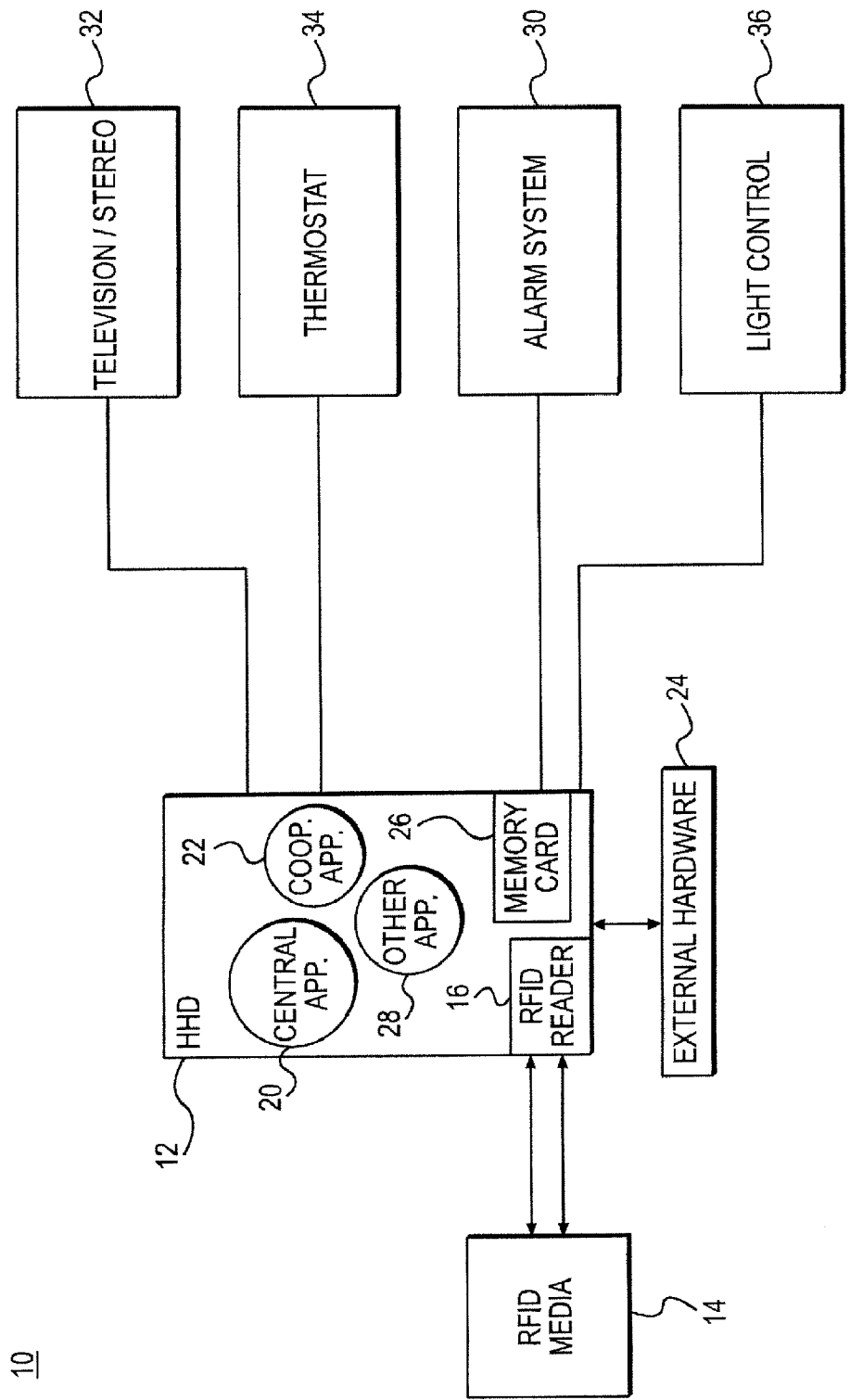
FIG. 1 is a block diagram illustrating an embodiment of a system for interactively interfacing HHDs and RFID media.

Described herein are embodiments of systems and methods for interactively interfacing handheld electronic devices (HHDs) and radio-frequency identification (RFID) media, such as Near Field Communication (NFC) or FeliCa media. Embodiments include systems and methods that code HHDs, control HHDs based on proximity to RFID media, store controls and information internally in HHDs and externally in RFID media, trigger such controls in a location-based context and transfer information to and from HHDs and RFID media. Embodiments are implemented as a HHD application in which a user may modify or change settings on their HHD or in their environment by or based on proximity to RFID media. Embodiments uniquely enable a user to store commands or code on RFID media to cause preset functions to occur on the user's HHD or in the user's environment by being in the presence of the user-modified RFID media.

When the term "user" is used throughout this specification, it is generally meant to refer to end-users that own and operate HHDs and that will use HHDs with the functionality described herein.

HHD users may use certain embodiments to control settings or functions of the users' HHDs; in embodiments, users may control settings or functions of the HHDs based on the location of use of the HHDs (such as in their car, office or home). In these embodiments, specific functions of the HHDs may be activated, or inactivated, (based on user input) based on the given location (e.g., a car). For example, in a car a user may wish to have the HHD's GPS and Bluetooth "ON", but the HHD's WiFi settings "OFF". In this example, the RFID reader on the HHD interacts with the RFID tag/sticker placed in the car and configures the HHD based on the unique settings previously programmed by the user. This makes the usage of the phone much more efficient for the user by only turning ON (or OFF, as the case may be) functions or settings the user has pre-specified for a specific location (i.e., at the location at which the RFID tag/sticker is placed). At the same time, valuable battery power of the phone is conserved by not using power intensive features such as WiFi that the user does not regularly use in those specific locations (e.g., in the car).

Embodiments are not limited to configuring the HHD to specific settings and programs based on the HHD's specific and unique location. Embodiments program HHDs (e.g., via an application) to transmit commands (over WiFi or other radiofrequency technology) to, for example, turn on and turn off lights, appliances, etc. For example, embodiments may program a HHD to turn on a television and room lights and turn off an alarm security system when the HHD enters a house (e.g., triggered by the HHD moving into range of certain RFID media).

In other embodiments, specific, unique data is transferred onto RFID tags of produce and other perishables to "time stamp" and give the perishables a unique code. The time stamp may be received and processed by an application to indicate whether the perishable has reached its expiration date or not. The unique code enables multiple units of the same perishable to be distinguished from one another (e.g., to distinguish one milk carton from three otherwise identical milk cartons in the same refrigerator). This embodiment is different than what was is currently described in the art in which an RFID reader simply reads information on the RFID tag that was placed on the produce item by the original manufacturer. There are limitations with this prior art method; one example being the fact that if one places two otherwise identical milk cartons in the refrigerator, the RFID tags on the milk cartons may cancel each other's signals and the reader would record zero milk cartons. To explain, in current RFID readers and tags, the communications protocol between the reader and the tags may use a scheme similar to slotted Aloha in which slots are provided for the tags to send text. Due to physical constraints, tags are unaware of other tags and, therefore, collisions may occur when multiple tags use the same slot for sending text. Since tags choose their slots randomly, collisions may be resolved in subsequent read iterations, and after a number of iterations, identification data from all tags may be retrieved. See, Harald Vogt, "Efficient Object Identification with Passive RFID Tags," Swiss Federal Institute of Technology (ETH), August 1998. Also there is no way to identify the two milk cartons apart (because they have the same ID tags) and therefore no way to keep track of each of them individually.

In this manner, embodiments may monitor items so that when an item is removed from, e.g., a refrigerator or closet, and not replaced, an RFID reader, e.g., in the refrigerator or closet, via peer-to-peer communication, transfers that information to a HHD (e.g., via the HHD's built-in RFID reader). This data may then be interfaced via an application to a user's shopping list, e.g., stored on the user's HHD (or to a family's shopping list stored in a family "cloud" storage) for shopping purposes or may be automatically transmitted by the HHD to the local produce store for home delivery. Further, when a user at a checkout line uses a HHD to pay for items (e.g., using RFID technology), the information of the items bought may be transferred to an application on the HHD. When receiving this information, the application may remove the item, e.g., a milk carton, from the user's shopping list and all other relevant shopping lists, e.g., via a cloud or other modalities such as peer-to-peer transfer.

In other embodiments, inventory of such items like water cooler water bottles and office supplies kept in supply closets may be tracked with RFID readers. For example, a water cooler may have a built in RFID reader that can interrogate RFID media on the water bottle and time stamp the RFID media of each water bottle uniquely and keep inventory. When the number of water bottles is low (e.g., set as an arbitrary number by a user), the RFID reader transmits that information to a HHD for processing. An application on the HHD may send that information to the water dispensing company for delivery or simply alert the user that the water bottle supply is low. Similarly, an RFID reader time-stamps office supplies, and when a particular office supply item runs low, transmits that information to a HHD for processing. An application on the HHD may send that information to a vendor for delivery or simply alert a user that the supply is low.

HHDs may include known and future mobile telephones, particularly, mobile smartphones, as well as other handheld electronic devices such as handheld computers, cameras and media devices. Such examples include the Apple iPhone™, the Google Android™ phones, and the Blackberry™ HHDs may also include larger devices such as iPads™, notebook, laptops and other mobile computers. In some embodiments of systems and methods described below, a non-mobile, fixed device, such as a RFID interrogator/reader with or without additional functionality may be used instead of a HHD.

The following refers to embodiments for changing the settings of the HHD automatically based on the location of the HHD.

With reference now to FIG. 1 shown is an embodiment of a system 10 for interactively interfacing HHDs and RFID media. System 10 includes a HHD 12 and one or more near-field communications ("NFC")-compatible RFID media 14. HHD 12 may be equipped with a RFID reader/interrogator 16. RFID reader/interrogator 16 may be, e.g., a near-field communications (NFC) reader, a Felicity Card ("FeliCa") reader or any similar technology RFID reader. The present application discusses NFC and NFC readers, but embodiments include, in general terms, RFID technology when mentioning these terms. RFID reader/interrogator 16 may be any device capable of reading information from and writing information to RFID media 14. When used herein, RFID reader/interrogator, RFID reader or RFID interrogator are synonymous. Such information, as described herein, may include commands, command sets, messages, etc. HHD 12 may also include a central application 20 that may implement methods described herein. Basic building blocks of embodiment of central application 20 include a command interpreter (to interpret commands and command text), a reader interpreter (to interpret messages from RFID reader/interrogator 16), one or more cooperative interfaces to other applications (to interface and communicate with cooperative applications 22), and memory for the command(s). It is understood that some HHD operating system providers incur restrictions, e.g., sandbox, on applications, these restrictions preventing cooperative applications or plug-ins for security concerns.

For example, central application 20 enables a user to create and transmit specific command text or sets of command text to an external media, such as RFID media 14 (as also noted below, central application 20 may also enable user to create and transmit specific message text or sets of message text to an external media, such as RFID media 14). The user may place the command or command set by writing through the application to the RFID media 14 for storage. The RFID media 14 storage may be a passive repository known and used in the industry (e.g., a passive RFID tag). This passive media it is not active when not coupled with the RFID reader/interrogator and is only active when it obtains energy from the RFID reader/interrogator when interrogated. In alternative embodiments, RFID media 14 may be an active RFID media (e.g., an active RFID tag). An active RFID media is active and energized through its own or a connected power source.

A unique aspect of embodiments described herein is that commands placed on RFID media 14 may be device-specific. The user may assemble, e.g., using the application, a complex set of commands/instructions specifically for the device and transmit the set for storage on the RFID media 14. The command set may be transmitted with a unique HHD identifier ("HHD ID") for the HHD 12 to the RFID media 14 and/or a separate user ID. This HHD ID (e.g., PIN, MEI, etc), user ID and/or a RFID media ID may be used to encrypt the command or command sets. In this manner the one or more commands or command sets are associated with the HHD 12, cannot be associated with another HHD or be altered by another HHD or other electronic device. Only the unique HHD 12 may decrypt and execute the command or command set. The storage of the RFID media 14 may be limited and may only allow a limited number of commands to be stored on the RFID media 14. However, the commands stored on the RFID media 14 may be from one or more HHDs so that different, unique sets of commands may be accessed and executed by different HHDs from the same RFID media 14. In embodiments, an HHD 12 has only the authority to restore, replace, or delete any commands with the same HHD ID With continuing reference to FIG. 1, in embodiments, HHD 12 includes an application that implements methods described herein, central application 20. In an embodiment, a central application 20 may instruct HHD 12, one or more cooperative applications 22, or hardware 24 interfaced to HHD 12 to perform functions. In embodiments, central application 20 so instructs by sending commands, e.g., code specific to the HHD 12, cooperative applications 22 and hardware 24, that HHD 12 executes to control functional features of HHD 12, cooperative applications 22, or hardware 24. The functional features may be functions of the I-HHD 12, cooperative applications 22, or hardware 24, as described herein or otherwise, such as internal functions for turning on/off WiFi reception, turning on/off GPS functions, causing HHD 12 to enter sleep mode, or external functions such as transmitting signals/commands to turn on/off lights 36, a television(s) 32, an alarm system(s) 30, a thermostat(s) 34, a computer(s), other appliances, etc. The central application 20 may send this commands as directed by a user or in response to commands received from RFID media 14, such commands being previously stored on RFID media 14 by central application 20 or otherwise. For example, a user may use central application 20 to create, transmit and store one or more commands or command sets, via RFID interrogator 16, on RFID media 14. Central application 20 may provide an interface for a user of HHD 12 to enter inputs, create or select commands and messages, and instruct storing of commands and messages on RFID media 14.

When HHD 12 is coupled to RFID media 14, RFID interrogator 16 may receive the commands (e.g., specific to HHD 12) from RFID media 14. RFID interrogator 16 may provide the commands to central application 20 for processing. Central application 20 may execute the processed commands simply by passing them on or by issuing necessary code to, executing necessary code to cause, or otherwise instructing, HHD 14 (HHD processor), cooperative applications 22 or hardware 24 to perform the command functions. The commands stored on RFID media 14 may include commands or code for controlling and causing HHD 12, cooperative applications 22 and hardware 24 to execute functions dictated by commands.

The commands and/or code may be stored by central application 20 inside the central application 20 or a cooperative application 22 in the HHD 12 permanent memory or internal memory media (e.g., a memory card) 26, or stored in an external media device, such as RFID media 14. Communications allowing reading and writing to this external media can be through capabilities of HHD 12 (e.g., WiFi, Wireless, Bluetooth, etc) or by external hardware 24 (e.g., RFID reader, NFC, Felica, etc). As noted above, RFID media 14 may be, but is not limited to an active or passive RFID tag. Passive tags come in specific tag formats such as Mifare (ISO 14443A) and associated near-field communications (NFC, ISO 18092/2004) and FeliCa (Japan). The NFC protocol is compliant with the ISO 14443 HF air-interface standard that supports the Mifare and FeliCa protocols, which communicate at 13.56 MHz. There are currently two storage capacities available for passive RFID tags: 1k and 4k, respectively. Future RFID tags with larger capacities will work well with embodiments described herein. Although RFID media 14 is NFC-compatible, other RFID media may be used.

With continuing reference to FIG. 1, in embodiments, central application 20 may interface with and issue commands to cooperative applications 22, but not with other applications 28 that do not adhere to the cooperative interface with central application 20. Central application 20 may also interface with and issue commands to external hardware 24. External hardware may provide services not found in HHD 12. Some examples of external hardware 24 include RFID reader/interrogator (if HHD 12 does not include). Other external hardware 24 may include, e.g., bar code readers, biometric readers (iris, fingerprint, DNA, etc), blood toxicity meters, glucose meters, frequency scanners, etc. In embodiments, the code is a function or service that the central application 20 can execute to control cooperative application(s) 22, external hardware 24, or HHD 12.

The command sets may be text-based identifiers, for example two letters or more values, associated with a specific function and an action value. For example, command +GPS could mean turn on Global Positioning System (GPS) function of HHD 12 whereas −GPS would turn off the GPS function. Such functions would be associated with programmable features/applications of HHD 12 made available through the user interface.

Another example would be a command to check the charge status (e.g., BAT) of HHD 12 and recommend placing the HHD 12 into Recharge Mode once inside the home or office. This would be similar to the manual user interface such as those found in the HHD tool set or settings. These could include random sequential change in personalization of the HHD's screen, skin, Wall paper, screen saver, multimedia or connection functions such as Blue tooth, WiFi, radio or external sync (e.g., ear piece) being "ON" or "OFF".

For example, in an embodiment of system 10, one or more RFID media 14 is located in a user's car. RFID media 14 can be loaded with a set of commands that are read by the user's HHD 12 to execute when within the proximity of the reader and NFC media 14. The command or set of commands are pre-stored to RFID media 14 by the user. These could be commands such as to turn on Bluetooth and GPS, but turn off WiFi, when HHD 12 is in the car.

Another embodiment of system 10, would include one or more RFID media 14 located at the front door of a user's house or at some other entry to the house. When the user's HHD 12 is in proximity to RFID media 14, the specific command set read by RFID interrogator 16 would turn off the Bluetooth and GPS functions of HHD 12 (conserving battery power) but turn on short range telecommunications antenna (e.g., WiFi). Other command sets might be household specific, such as if the house has a command set security function, HHD 12 could be told to inform the security company of the user's presence and make positive identification (e.g., Voice, PIN ID, Biometrics, etc) and disable the security alarm 30 of the house. Other commands might cause HHD 12 to transmit signals turning on television and/or stereo 32, adjust thermostat 34, and activate lights through lighting controls 36. In embodiments, as described above, central application 20 may receive and process commands from RFID interrogator 16 and issue code that causes HHD 12 or other component to perform functions per commands.

With continued reference to FIG. 1, another embodiment of system 10 includes one or more RFID media 14 located in certain locations, such as scenic areas that include commands to automatically set camera settings (such as shutter speed, exposure, etc) of HHD 12 (including, camera-equipped with a RFID reader 16) when HHD 12 is proximate to RFID media 14. The camera settings may be set to produce the most optimal photos in the location. Similarly, location may be sensitive areas such as a particular building or part of a building in which pictures are prohibited (e.g., government buildings, gym lockers). Consequently, RFID media 14 may include commands that, when HHD 12 is proximate to RFID media 14, cause camera features to be disabled upon entry and re-enabled upon exit. In embodiments, as described above, central application 20 may receive and process commands (e.g., initially received from RFID interrogator 16) and issue code that causes HHD 12 or other component to perform functions per commands.

In yet another embodiment of system 10, a user may store one or more messages on a specific RFID media 14. A message may be any type of textual communication that is intended for retrieval by one or more HHDs 12 that pass within interrogation range of RFID media 14. A message may include any amount or type of text (subject to storage limitations of RFID media 14), such as a single character, multiple characters, a word, multiple words, phrases, sentences, numbers, letters, etc. A message may be intended to be displayed (or otherwise output) to a recipient on recipient's HHD 12 or may be intended to only be internally processed by recipient's HHD 12. A message may be a reminder, note, comment, instructions, shopping list, or virtually anything the user intends. Indeed, the message may be intended for the user him/herself, e.g., as a note for later retrieval when next passing by RFID media 14. A message transmitted by HHD 12 and stored on RFID media 14 may be referred to as a "text drop," i.e., text dropped on RFID media 14 by HHD 12. Messages may convey virtually any information and may convey that information to HHD users or merely for internal processing by the HHD. Messages should not be confused with text messages that are transmitted from one handheld telecommunication device to another via a telecommunication network.

A message may be for any user's HHD 12 that passes proximate to RFID media 14 or only to one or more specific users' HHDs 12 that pass proximate to RFID media 14. Accordingly, messages may include one or more specific user or HHD IDs. The message may be encrypted or otherwise stored with IDs so that only HHDs 12 with necessary IDs can de-crypt or otherwise retrieve and open message. Such messages may be consider to be electronic "Post-It™" notes. For example, a wife can access software on her HHD 12 and write a specific message in the car in presence of RFID media 14 to remind her husband to pick up the dry cleaning when he is next in the car. HHD 12 stores the message on RFID media 14. When her husband is in the car and his HHD's 12 RFID reader 16 interrogates RFID media 14 in the car, the message may be transferred to his HHD 12 for his reading. In embodiments, as described above, central application 20 may enable user to create and store messages on RFID media 14, including storing necessary IDs and encrypting as described herein.

Yet another embodiment of system 10 would include one or more RFID media 14 in areas where certain radio frequency (RF) settings of a phone should be disabled, such as in an airplane or hospital rooms. Such RFID media 14 would include commands stored thereon to disable such settings. For example, when an HHD 12 is within the presence of such RFID media 14 on a plane, the HHD 12 may retrieve commands to turn off the WiFi, GPS, blue tooth, and other network functions of HHD 12. RFID media 14 may also include commands so that when passenger leaves the plane, or other similar area, the RF settings on HHD 12 revert back to original or normal settings (e.g., ON).

In certain embodiments of system 10, RFID media 14 is not installed in any fixed—location but may be portable and carried around by a user, on an item, and animal, a vehicle, or otherwise. Such RFID media 14 may have messages and/or commands stored thereon that convey information to HHDs 12 and/or other RFID readers, or instruct functions be performed, when the RFID media 14 is in proximity to the HHDs 12 or other RFID readers. In these embodiments, it is the presence of the RFID media 14 in the environment, rather than the presence of the HHD 12 in an environment that includes a fixed RFID media 14, that triggers the transfer of messages (e.g., information) or commands. Examples of such embodiments are described herein.

Figure 2:
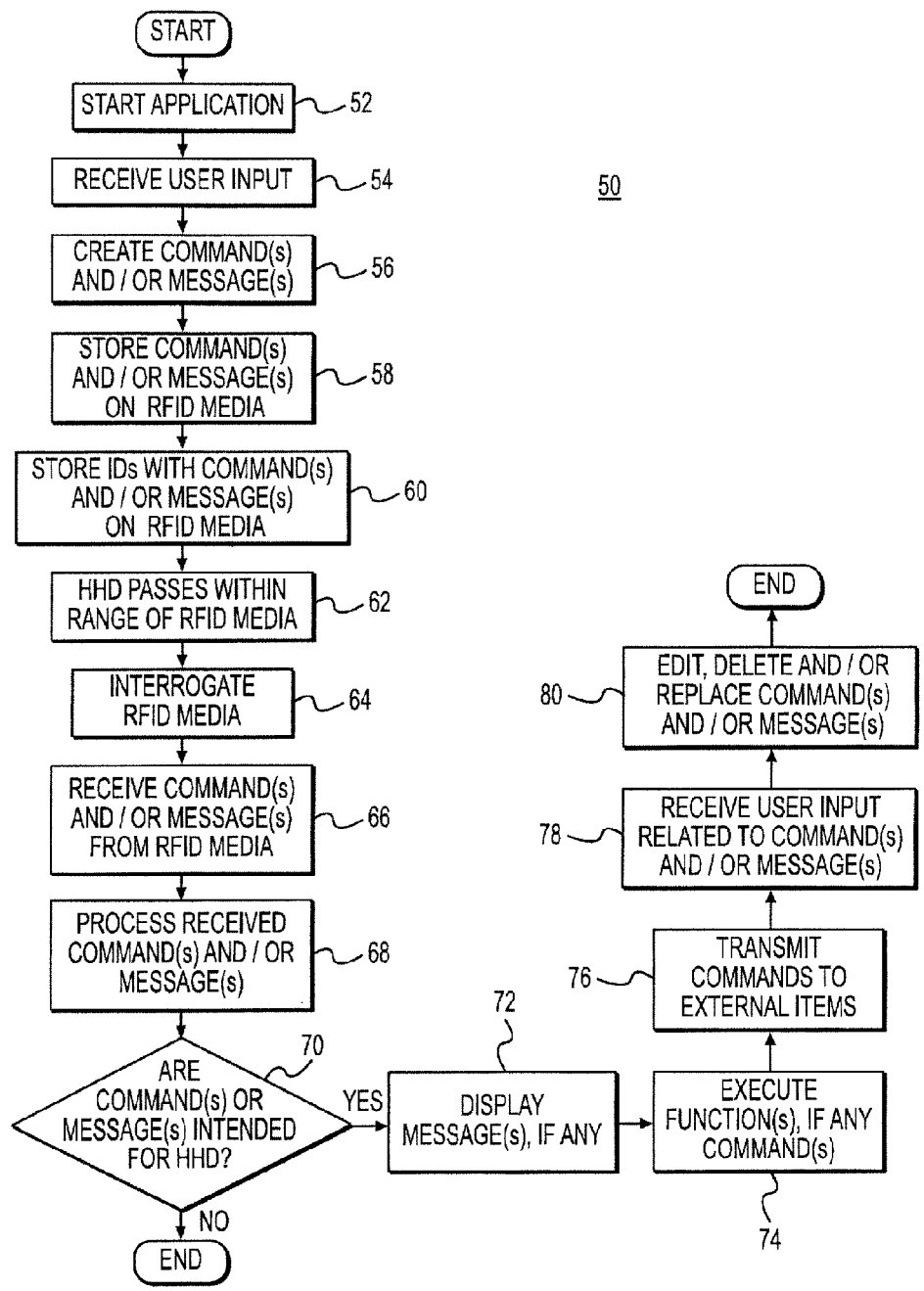
FIG. 2 is a flowchart illustrating an embodiment of a method for interactively interfacing HHDs and RFID media.

With reference now to FIG. 2, shown is a flowchart illustrating an embodiment of method 50 for interactively interfacing HHDs and RFID media. Method 50 starts application on HHD for interfacing with RFID media, block 52. Application may be central application described above with reference to FIG. 1. As noted above, application may provide interface for user input. Input, e.g., user input, is received through interface of application, block 54. Input may specify functions that a user wants executed when HHD passes near RFID media. Input may specify messages that user wants stored on RFID media for later retrieval by same or a different HHD. Functions may be, e.g., functions of HHD, applications on HHD (e.g., cooperative applications), or external hardware. Functions may be any of the examples provided herein, such as turning on or off features or settings on the HHD (e.g., WiFi, GPS, blue tooth, network functions, camera, internet access, etc.), causing HHD or application on HHD to transmit signals to turn on or off lights or appliances in environment, etc. Message may be any message intended for later retrieval by the same or another HHD, as described above. Alternatively, message may include time-stamp or other unique information intended to be stored on RFID (e.g., to keep track of inventory and inventory expiration dates), as described above.

Application may create one or more commands, command sets and/or messages per the input, block 56. As noted above, commands and command sets may be text-based identifiers, for example two letters or more values, associated with a specific function and an action value. The commands and command sets may cause HHD, applications or other hardware to execute the input functions. HHD (e.g., central application) may include instructions for translating the user-specified functions into the necessary commands or command sets to execute the functions. The instructions may include look-up tables identifying the code necessary to execute the functions. In alternate embodiments, received 54 user input may directly specify the commands or command sets (e.g., the code) to execute the functions.

When in range of the intended RFID media, application may transmit and store the one or more commands, command sets and/or messages to and on the intended RFID media, block 58. The application may transmit and store commands, command sets and/or messages to and on intended RFID media via the RFID reader/interrogator in any variety of manners known and understood by those of ordinary skill in the art. The application may transmit and store one or more user, HHD IDs and/or RFID ID, with associated commands, command sets and/or messages, to and on the intended RFID media, block 60. The application may transmit and store the ID(s) in the same step or a separate step with the commands, command sets and/or messages. Likewise, the ID(s) may be associated with the commands, command sets and/or messages on the HHD prior to transmitting or after transmitting on the RFID media. The storing 60 may include encrypting the commands, command sets and/or messages so that only the intended HHD and user may retrieve the commands, command sets and/or messages.

The above describes steps for storing commands, command sets and/or messages on an RFID. In embodiments, RFID media may have pre-stored commands, command sets and/or message. Such preset RFID media may include commands, command sets and/or messages that are stored on the RFID media during manufacturing, at a point of sale (e.g., a car dealership, grocery store, etc) or otherwise prior to installation of the RFID media at a specific location or on a specific item. Whether preset or stored by a user using embodiments described herein, commands, command sets and/or messages on RFID media may be later edited and may be read from RFID media.

With continuing reference to FIG. 2, in embodiment of method 50, HHD passes within range, and becomes proximate to, RFID media with command(s), command sets and/or messages stored thereon, block 62. RFID media is interrogated by RFID reader/interrogator on HHD, block 64. RFID reader/interrogator may interrogate RFID media in manner known to those of ordinary skill in the art. One or more commands, command sets, and/or messages are received from RFID media, block 66, and processed by HHD (e.g., by central application), block 68. As noted above, commands, command sets and messages may be specific to one or more HHDs. When stored on the RFID, the commands, command sets and messages may be stored with a user ID and/or HHD ID or even encrypted with such IDs. Consequently, processing 68 may include determining if command(s), command set(s) and/or message(s) are intended for HHD, block 70. Determining 70 may include decrypting the command(s), command set(s) and/or message(s).

If one or more messages are received 66 and determined 70 to be intended for HHD, the message(s) may be displayed (or otherwise output to user), block 72. For example, the message may be a message stored on the RFID media by another user for later retrieval by the current user (e.g., an electronic Post-It note, as described above). The message may be a secure or sensitive message or information that is encrypted and stored on the RFID media for retrieval only by a specific user using a specific HHD. The message may be double-encrypted, using known methods, with the user ID and the HHD ID and determining 70 may require the user to enter the user ID and/or a password to successfully decrypt the message (e.g., the user may enter such information through a display/interface provided by the central application). Alternatively, a message may simply be information that is intended to be stored or be internally processed by HHD or an application thereon. For example, if RFID media is, e.g., a RFID tag located on a grocery item or merchandise item on a shopping list, message may simply be information describing the item. The shopping list may be maintained by an application on HHD (e.g., central application or cooperative application) or elsewhere (e.g., home computer). Consequently, processing 68 may extract information and remove item from shopping list, or transmit information describing item to application maintaining shopping list for such removal. Further, a message may simply be information that is intended to be passed on to another device. Passing on this information may be done to indicate the presence of the HHD at the location of the RFID media.

Message may be displayed 72 on display of HHD. Alternatively, message may be converted to audio and output to the user through speakers of HHD. HHD (e.g., central application) may be set up by user to process and output the received 66 message per the user's preferences.

If one or more commands or command sets are received 66 and determined 70 to be intended for HHD, corresponding functions on HHD, cooperative application and/or hardware may be executed/performed, block 74. For example, such HHD settings as GPS and Bluetooth may be turned on while others such as WiFi may be turned off. Likewise, commands and/or command sets on the RFID media may instruct the HHD to transmit commands that affect the environment in which the RFID media and the HHD are located, or elsewhere. For example, HHD may transmit a command(s) to appliances, electronic equipment, light switches, thermostats, etc. (collectively referred here to as "external items"). Consequently, method 50 may transmit one or more commands to external items, block 76. The HHD may transmit such commands over WiFi, other radio frequencies and/or through a network connection, or other known means.

With continuing reference to FIG. 2, as noted above, commands, command sets and/or messages stored on RFID media may be edited. For example, after receiving a message intended for user, HHD may be used to delete the message and/or replace the message with a responsive message. Likewise, when HHD retrieves commands and/or command sets upon first passing in range of RFID media (e.g., on entering room or vehicle, etc.), HHD may alter commands and/or command sets so that, e.g., opposite functions are performed when HHD next passes in range of RFID media (e.g., on exiting room or vehicle). For example, if WiFi is turned off in HHD upon entering airplane, command may be altered to turn on WiFi upon exiting airplane. Likewise, in response to executing a command(s) or receiving a message(s), HHD may store a new command(s) and/or a new message(s) on the RFID media, including, e.g., a message(s) indicating that the command(s) and/or message(s) have been received and/or executed. Consequently, method 50 may receive user input or automated commands relating to retrieved command(s), command set(s) and/or message(s), block 78 and edit, delete and/or replace command(s), command set(s) and/or message(s) per same, block 80.

Figure 3:
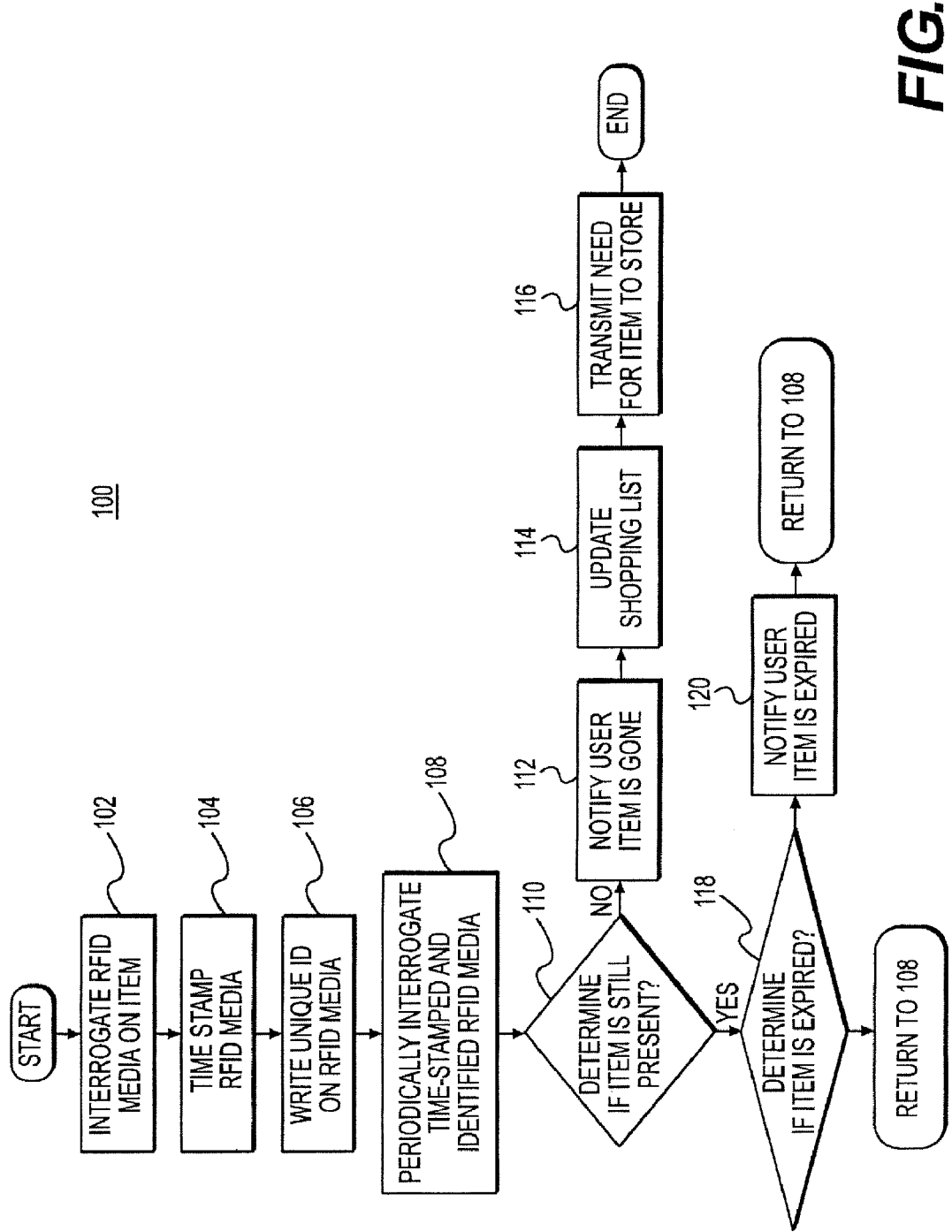
FIG. 3 is a flowchart illustrating an embodiment of a method for interactively interfacing HHDs and RFID media.

With reference now to FIG. 3, shown is a method 100 for interactively interfacing handheld device and RFID media. In method 100, a stand-alone RFID reader/interrogator interrogates RFID media on a consumable or perishable item and transfer the information regarding the item to HHD (e.g., to central application) for processing, block 102. RFID reader/interrogator (e.g., built-in, for example, a kitchen appliance such as a refrigerator) may transfer this information via peer-to-peer transfer (known in the art) to a HHD (e.g., to RFID reader/interrogator in HHD). In addition, RFID reader/interrogator may be WiFi enabled, so that it may connect via WiFi, ethernet or other connection to a HHD or otherwise through a network, and may be installed on or built-in, e.g., a refrigerator, freezer, pantry closet, cabinet, other closet or other location where consumables or perishables are stored. Consumable may be perishable grocery item, such as a carton or gallon of milk, or an office supply item, such as paper or pens. RFID media may be a RFID sticker or other attachable RFID tag. When interrogating 102 item, RFID reader/interrogator may retrieve information from RFID media describing the item, including information identifying the item and the item's expiration date. This information may be transmitted 102 to HHD. Central application, or other application on HHD, may keep track of item and its expiration date. RFID reader may transfer the information to HHD via peer-to-peer NFC transfer or otherwise over a network.

Alternatively, RFID reader/interrogator may be part of or connected to a computing device (e.g., with a processor, memory, transmitter, etc) that includes central application described above and/or is otherwise functionally capable of performing functions of HHD described above. Such computing device may be installed on or built-in to the, e.g., a refrigerator, pantry closet, cabinet, or other location where consumable is stored. In such an embodiment, RFID reader/interrogator interrogates 102 RFID media on a consumable or perishable item and simply transfers the information to the computing device. The computing device may be a HHD temporarily or permanently installed on, e.g., a refrigerator, pantry closet, cabinet, or other location where consumable or perishable is stored.

RFID reader/interrogator may time stamp the item's RFID media, block 104, and/or write a specific, unique identifier (e.g., an ID number) on the item's RFID media, block 106. RFID reader/interrogator may determine time from HHD or network. Likewise, unique identifier may be provided by HHD (e.g., by central application). Indeed, HHD (e.g., central application) may instruct RFID reader/interrogator to time-stamp 104 and write unique identifier on RFID media, block 106, e.g., in response to receiving information interrogated 102 from RFID media. Time-stamping 104 and/or uniquely identifying 106 an item's RFID media enables the item to be uniquely identified and tracked so that it is not confused or mistaken for another item of the same type.

With continuing reference to FIG. 3, RFID reader/interrogator may periodically interrogate time-stamped and/or uniquely identified item's RFID media and transfer information regarding the item to HHD (e.g., to central application) for processing, block 108. For example, RFID reader/interrogator built-in to refrigerator may interrogate any RFID media present in the refrigerator. If HHD (e.g., central application) determines that item is no longer present (i.e., item has been thrown out or used up), block 110, HHD may notify user (e.g., as described above), block 112, and update shopping list maintained on HHD or elsewhere (e.g., by central application), block 114. HHD (e.g., central application) may determine 110 that item is no longer present if RFID reader/interrogator fails to detect presence of item in repeated attempts over a set period of time (e.g., 30 minutes). For example, if RFID reader/interrogator does not successfully interrogate RFID media on previously identified item, HHD may determine 110 item is not present. The user may set the time through, e.g., central application interface. HHD (e.g., central application) may update 114 shopping list on other HHD's via peer-to-peer transfer or by transmitting the data via a cloud to another HHD or other computer. In certain embodiments, HHD (e.g., central application) may transmit need for item to shopping list maintained by store for a timed delivery service, block 116.

If item is determined 110 to still be present, HHD (e.g., central application) may determine whether item is past its expiration date (e.g., by comparing to expiration date transmitted 102 and stored by central application), block 118. If past its expiration date, HHD may notify user (e.g., through central application display, text message, e-mail, etc.) that item has expired and should be thrown out, block 120. If not expired, periodic interrogation 108 may continue.

It is noted that any computer running central or other application may also perform steps performed in method 100 by HHD. For example, RFID reader/interrogator may transfer 102 and 108 interrogated information to central application resident on home desktop or notebook computer. Such application may maintain shopping list and otherwise perform actions performed by central application on HHD as described above.

Figure 4:
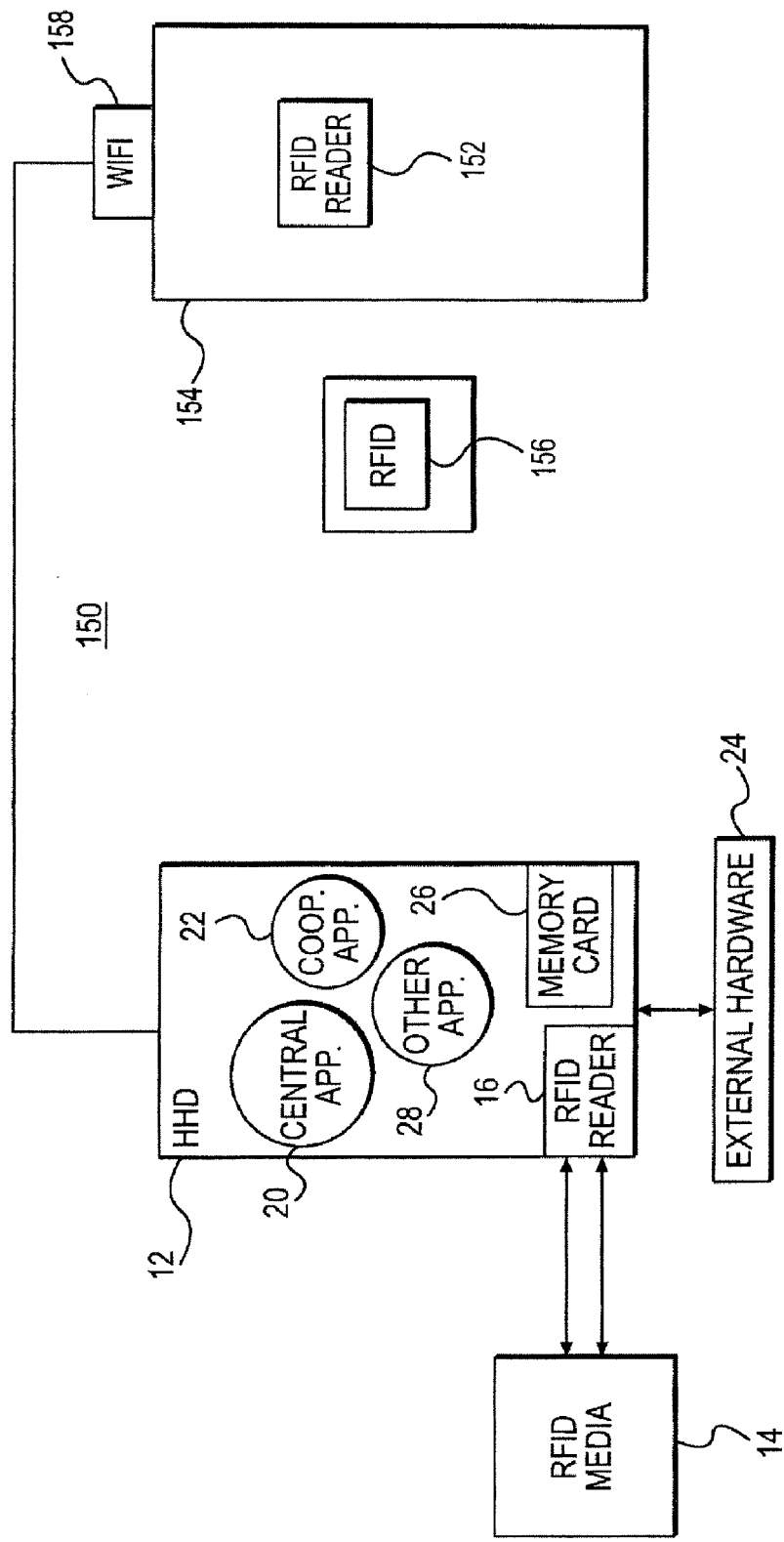
FIG. 4 is a block diagram illustrating an embodiment of a system for interactively interfacing HHDs and RFID media.

With reference now to FIG. 4, shown is an embodiment of system 150 for interactively interfacing handheld device and RFID media as described with reference to method 100 shown in FIG. 3. In embodiment of system 150 shown, RFID reader/interrogator 152 is built-in to refrigerator 154, although principles apply equally to RFID reader/interrogator 152 installed in pantry closet, storage closet, cabinet, etc. RFID reader/interrogator 152 interrogates RFID media (e.g., RFID stickers) 156 on items placed in refrigerator 154. If this is the first interrogation of item, RFID reader/interrogator 152 may time-stamp and/or places unique identifier on RFID media 156 of the item. WiFi transmitter 158 connected or built-in to RFID reader/interrogator 152, transfers information regarding item to HHD 12 (e.g., via peer-to-peer transfer to RFID reader/interrogator in HHD 12. Central application 20 on HHD 12 may process the information as described above. Central application 20 may transfer information to additional HHDs 12' as shown in FIG. 4.

In alternate embodiment, RFID reader/interrogator 152 is part of a computing device, such as computing device (not shown) described above with reference to FIG. 3, which is also installed on or build-in to refrigerator 154 (or, e.g., pantry closet, storage closet, cabinet, etc.). Such computing device may include central application 20 and otherwise be capable of performing functions of HHD 12 described herein. Accordingly, RFID reader/interrogator 152 may simply transfer information regarding item to computing device, e.g., to central application 20 installed in computing device for processing as described above. Central application 20 on computing device may also transfer information to additional HHDs 12'.

With reference again to FIG. 1, in an embodiment, central application 20 provides the necessary overhead, headers, and environment to execute the functions on HHD 12, e.g., commanded by commands on RFID media 14, without having the user addressing all the programming details. For example, iPhones are based on a underlying Unix environment, just as the Macintosh system. This environment is the foundation to the Macintosh computer and the iPhone, iPod, and iPad family of HHD devices. As such, programming in the iPhone is done in Object C that is the foundation to Unix. Object programming, specifically called object-oriented programming (OOP), is a programming paradigm that uses "objects"—i.e., data structures consisting of data fields and methods together with their interactions—to design applications and computer programs. Hence, in Object C, all functions or objects can be written in C, which is a basic programming language.

An issue with any language is to encase the functions that work together in a proper and supportive structure. In an embodiment, a role of central application 20 is to encase the functions that work together on the HHD 12 in a proper and supportive structure. In an embodiment, for every function within central application 20, there is corresponding Object C code. When the functions are strung together with their applicable input and output parameters, central application 20 will take the strung-together functions and parameters and wrap the functions and parameters into an executable program.

With continuing reference to FIG. 1, cooperative applications 22, or other HHDs 12, or peripheral hardware 24 must provide a sound object code with simple and limited input and output parameters. Apple Corp intentionally does not provide a 'Terminal' program that allows access to the Unix operating system within the iPhone or other Apple HHDs, so as to prevent access to operations that could create harm or accidental corruption of the HHD system. Similar HHD manufacturers also may not provide such access. Hence, in embodiments, a role of central application 20 is to allow approved controls to the average user, offered and authorized by Apple or other HHD manufacturers, as well as approved and cooperative controls/functions provided by cooperative applications 22 or hardware interfaces. As noted, this role is not simply limited to Apple and their operating system but includes others such as Symbian, WinMobile, Android, etc.

For example, an embodiment may use an existing and cooperative email application 22, which can share new emails or send out new emails with other applications. At that same time, a cooperative printer application 22 (e.g., Epson iPhone application) can also share functions that allow for printing actions. Being cooperative with central application 20, the email and printer applications 22 can be put together in a short command/code sequence with input/output parameter, and saved to an RFID tag 14 located near the Printer. The later saving to an RFID media 14 may be done by another code sequence saved within central application 20 memory. Accordingly, when HHD 12 comes within range of the RFID tag 14, the RFID tag 14 is read and the command/code sequence on the RFID tag 14 is downloaded and executed. In this case, the executed command/code sequence may cause any new email, based on a time/date stamp as part of the code sequence, to be sent to the printer.

In embodiments described herein, central application 20 gives users control over HHD 12 internal functions and features, as well as, functions and features of cooperative applications 22 and hardware 24. Such commands may be saved internally in HHD 12, but most important they can be saved to external media 14 (e.g., RFIDs, NFCs, FeliCa, etc) for latter recall and use. HHD 12 can then change settings, function, information and processing based on the HHD's 12 location in terms of proximity to these external media 14. Other current products are canned applications that cannot be changed and cannot take advantage of other capabilities provided by third-party applications 24 of HHD 12. Likewise, prior art systems require reference back to a service provider and/or mainframe/server computer to execute changes on HHD 12. Embodiments allow for a simple command codes as functions in one-line or BAT file structures. These codes can be strung together to create simple or complex instructions for HHD 12 or remote devices and can be controlled directly by the end user. Unlike conventional applications that are canned instructions to do specific actions, this string of commands allow a greater or general control of HHD 12. As noted above, basic building blocks of embodiments include a command interpreter, reader interpreter, the cooperative interface to other applications, and memory for the command(s).

As noted above, messages may include virtually any type of information. For example, the information may include patient medical information. Accordingly, when a patient sees a doctor, relevant updated medical information, such as immunization shot records, etc., may be transferred to RFID media 14 (e.g., via peer-to-peer transfer through RFID reader located near RFID media 14) that is conveniently located in the doctor's office. HHD 12 (e.g., central application 20) may encrypt the medical information with a patient identification number (ID) and/or a HHD ID, e.g., as described above, so as to only enable the patient and/or patient guardian to retrieve the information, in order to protect confidentiality of the information. Patients and/or patients' guardians may simply pass their HHD 12 in range of the RFID media 14 to retrieve the relevant medical information. For example, parents of young children have a difficult time keeping track of all their children's immunizations record. When the child's immunization record is updated in the doctor's computer system, a RFID reader may transfer the immunization record to the RFID media 14 in the doctor's office, and then to the parent's HHD 12, or directly to the HHD 12 via peer-to-peer communication between the RFID reader in the doctor's office and RFID reader 16 on HHD 12. Alternatively, parent may simply carry a RFID media card on to which the medical information is transferred by the doctor's office RFID reader. When the parent goes to their house, the medical information can be transferred from HHD 16 (or RFID media 14) to a computer system at home over WiFi or other radiofrequency methods. When a school requests the child's immunization record, the child may take the RFID media card with the immunization record to school, the immunization record may be transferred from the parent's HHD 12 to another RFID media, such as a paper embedded with RFID media, and taken to school, or the information may be otherwise electronically communicated to the school. In the same manner, patients can carry a list of their medications and allergies with them and continuously update them at their doctor's office.

In yet another embodiment, a library utilizes the systems and methods for interactively interfacing handheld device and RFID media. Library books are embedded with RFID tags 14 or other media. When a patron checks out a library book(s), a RFID reader at the library may write the due date and other pertinent information on the RFID tag. The RFID reader may also retrieve the due date and information describing the book(s) from the RFID tag 14 as well as information identifying the patron from the patron's HHD 12. This information is also transferred to the patron's HHD and processed by the HHD 12 (e.g., by the central application 20). The due date for the book(s) may be stored on the HHD 12 (e.g., by the central application 20). At the appropriate time, a due date reminder notice may be displayed on HHD 12 (e.g., by the central application 20), alerting the patron to return the book(s).

As can be seen by these examples, the embodiments described herein may be used for a large variety of purposes and implementations. As is also illustrated, RFID media 14 need not be stationary but may be used as a portable information storage that may be read from or written to by HHDs 12 and other RFID readers. For example, in another embodiment, users may carry RFID media 14 (alternatively, RFID media 14 may even be implanted into user's skin) that includes information relevant to user, such as security clearance, access rights, identifying information, ticket information (section/row, etc.) or other relevant information. Such information may be written to RFID media 14 by a HHD 12 or other RFID reader. When user enters or attempts to enter a secured area (e.g., building or room), a limited access area, an event arena or theater, etc., a HHD 12 or other RFID reader may interrogate the user's RFID media 14 and determine whether the user is entitled to entry. The HHD 12 or other RFID reader may time-stamp the user's RFID media or otherwise store a message on the RFID media indicating, e.g., when the user entered or attempted to enter, how many additional entries the user is entitled to, if any, how long the user is entitled to stay in the area, etc. In this manner, RFID media may act as a flexible and re-writable security or access pass or ticket for user and enable user's user thereof to be regulated and monitored.

Figure 5:
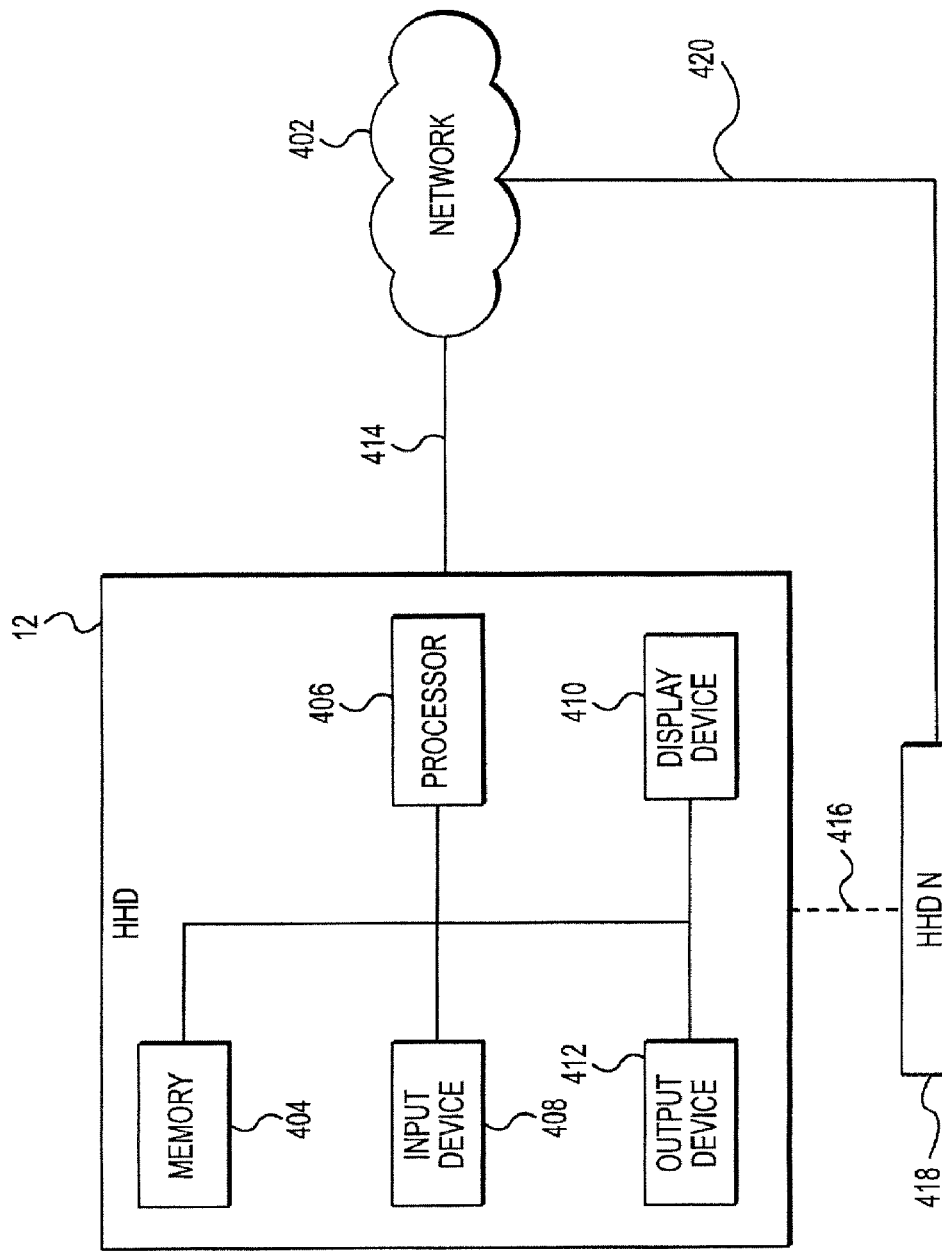
FIG. 5 is a block diagram illustrating an embodiment of hardware components for implementing embodiments of system and method for interactively interfacing HHDs and RFID media.

With reference now to FIG. 5, shown is a block diagram illustrating exemplary hardware components 400 for implementing embodiments of system and method for interactively interfacing handheld device and RFID media. HHD 12, or other device similarly configured, may include and execute one or more applications, including central application 20, to perform functions described herein, including steps of method 50 and method 100 described above. HHD 12 may connect with network 402, e.g., wireless telecommunication network, Internet, or other network, to transmit and receive information, commands, messages, etc. as described above.

HHD 12 may include a memory 404 and a processor 406. HHD 12 may also include an input device 408, a display device 410, an output device 412, and one or more antennas/transmitters 414/416. Memory 404 may include RAM or similar types of memory, and it may store one or more applications for execution by processor 406. Processor 406 executes the application(s), such as central application 20, cooperative applications 22 or other applications 28, which are stored in memory 404, or received from the Internet or other network 402. The processing by processor 406 may be implemented in software, such as software modules, for execution by computers or other machines. These applications preferably include instructions executable to perform the system and methods described above and illustrated in the drawings herein. The applications preferably provide graphical user interfaces (GUIs) through which users may view and interact with central application 20 and RFID media 14.

HHD 12 may store one or more database structures in memory 404, for example, for storing and maintaining information necessary to perform the above-described methods, such as commands, command sets, messages, shopping lists, etc. Alternatively, such databases may be in storage devices separate from HHD 12.

Also, as noted, processor 406 may execute one or more software applications in order to provide the functions described in this specification, specifically to execute and perform the steps and functions in the methods described above. Such methods and the processing may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the system.

Input device 408 may include any device for entering information into HHD 12, such as a touch-screen, keyboard, mouse, cursor-control device, touch-screen, microphone, digital camera, video recorder, etc. The input device 408 may be used to enter information into GUIs during performance of the methods described above. Display device 410 may include any type of device for presenting visual information such as, for example, a typical HHD screen. Output device 412 may include speakers or any device for providing information in audio form.

Antenna/transmitter 414/416 may include one or more antennas/transmitters or like devices for connecting to, transmitting to and receiving from a telecommunication network, such as CDMA or GSM mobile network 402. Likewise, antenna/transmitter 414/416 may also include WiFi or other antenna/transmitters for connecting to, transmitting to and receiving from other wireless networks 402 or other HHDs 418 (through peer-to-peer or via other networks 402).

Although only one HHD 12 is shown in detail, embodiments may use multiple HHDs 418 as necessary. HHDs 418 may be connected 420 to network 402. In addition, although HHD 12 is depicted with various components, one skilled in the art will appreciate that the server can contain additional or different components. In addition, although aspects of an implementation consistent with the above are described as being stored in memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling HHD 12, to perform a particular method, such as methods described above.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

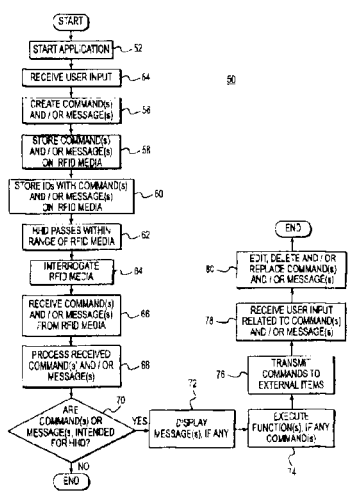

The invention claimed is:

1. A method for interactively interfacing handheld devices (HHDs) and radio frequency identification (RFID) media, comprising:

starting an application on a HHD for interfacing with a RFID media, wherein the HHD includes a RFID reader and the application provides a user interface for receiving user input on the HHD;

receiving user input entered directly into the user interface on the HHD that specifies one or more functions that are to be performed when HHDs pass near the RFID media wherein the received user input causes the HHD to create one or more executable commands corresponding to the specified functions and store the one or more executable commands on the RFID media and wherein the one or more functions may include operating HHD features, executing HHD applications, or transmitting commands to external items;

translating the specified one or more functions into the one or more executable commands that are executable by HHDs, wherein the one or more executable commands are read by HHDs and executed by HHDs to cause HHDs to perform the specified one or more functions when HHDs passes near the RFID media; and the HHD directly transmitting and storing the one or more executable commands on the RFID media using the RFID reader.

2. The method of claim 1 wherein the HHD is a first HHD, the method further comprising interrogating the RFID media with a RFID reader on a second HHD to track inventory.

3. The method of claim 2, further comprising time stamping the RFID media.

4. The method of claim 2, further comprising alerting a user when the inventory is low.

5. The method of claim 1, wherein the one or more commands are stored on the RFID media during manufacturing, at a point of sale, or prior to installation of the RFID media.

6. The method of claim 1, further comprising disabling radio frequency (RF) settings of the HHD when the HHD is within the presence of a RFID media on one or more of an airplane or a hospital room.

7. The method of claim 6, further comprising reactivating the RF settings of the HHD when the HHD is outside the presence of the RFID media on one or more of an airplane or a hospital room.

8. The method of claim 6, wherein the RF settings include one or more of WiFi, GPS, and blue tooth settings.

9. The method of claim 1, further comprising controlling settings of the HHD based on a location of use of the HHD.

10. The method of claim 9, wherein the controlling the settings of the HHD comprises activating GPS and blue tooth settings and inactivating WiFi setting of the HHD when the HHD is used in a car.

11. The method of claim 9, wherein the controlling the settings of the HHD comprises inactivating GPS and blue tooth settings and activating WiFi setting of the HHD when the HHD is used in a home.

12. The method of claim 1, wherein the RFID media is carried by a user and includes information relevant to the user.

13. The method of claim 1, wherein the RFID media is implanted into a user's skin and includes information relevant to the user.

14. The method of claim 12, wherein the RFID media includes one or more of security clearance, access rights, identifying information, or ticket information of the user.

15. The method of claim 12, further comprising, when the user enters an area including one or more of a secured area, a limited access area, or an event arena or theater, a second HHD interrogating the RFID media carried by the user or implanted into the user's skin to determine whether the user is entitled to entry.

16. The method of claim 15, further comprising timestamping the user's RFID media or storing a message on the RFID media indicating one or more of when the user entered, how many additional entries the user is entitled to, if any, or how long the user is entitled to stay in the area.

17. The method claim 1, further comprising the RFID reader reading and transferring, in a doctor's office, a child's immunization record to the RFID media.

18. The method of claim 17, further comprising transferring the child's immunization record from the RFID media to a computer system at home over WiFi.

19. The method of claim 17, further comprising transferring the child's immunization record from the RFID media to a computer system at school over WiFi.

20. The method of claim 1, wherein the user input is entered directly into the HHD to cause the HHD to create the one or more commands, wherein the one or more created commands are executable commands that instruct HHDs to perform one or more functions when the one or more commands are read from a RFID media and executed by HHDs, wherein the one or more commands are directly executed by HHDs without the HHD interacting with an external computing device, and wherein the storing includes the RFID reader transmitting the one or more created commands directly to the RFID media without the HHD interacting with an external computing device.

21. A method for interactively interfacing handheld devices (HHDs) and radio frequency identification (RFID) media, comprising:

passing a HHD within range of a RFID media that includes one or more commands stored thereon, wherein the HHD includes a RFID reader;

interrogating the RFID media with the RFID reader;

receiving, on the HHD, the one or more commands from the RFID media;

the HHD processing the one or more commands from the RFID media; and in response to the processing of the one or more commands, the HHD executing one or more functions, wherein the one or more commands are executable commands that instruct the HHD to perform the one or more functions when the one or more commands are read from a RFID media and executed by the HHD, wherein the one or more commands are directly executed by the HHD without the HHD interacting with an external computing device.

22. The method of claim 21, wherein in response to executing the one or more functions, the method further comprises storing one or more messages on the RFID media.

23. The method of claim 21, wherein executing the one or more functions includes transmitting commands to external items.

24. The method of claim 21, further comprising:

receiving user input relating to programming of the RFID media;

creating one or more commands or messages based on the received user input; and storing the one or more commands or messages on the RFID media using the RFID reader.

25. The method of claim 21, wherein the RFID media is installed at a fixed location and the one or more commands cause the HHD to execute one or more functions specific to the fixed location when executing the one or more functions.

26. The method of claim 21, wherein the HHD processing comprises a central application on the HHD processing the one or more commands from the RFID media.

27. The method of claim 26, wherein the executing the one or more functions comprises the central application on the HHD sending commands to a cooperative application instructing the cooperative application to execute a function of the cooperative application.

28. A system for interactively interfacing handheld devices (HHDs) and radio frequency identification (RFID) media, comprising:

a mobile smartphone, comprising a processor and memory, wherein the memory includes instructions for execution by the processor for:

providing a user interface for receiving user input on the HHD;

receiving user input entered directly into the user interface on the HHD that specifies one or more functions that are to be performed when HHDs pass near the RFID media, wherein the received user input causes the HHD to create one or more executable commands corresponding to the specified functions and store the one or more executable commands on the RFID media and wherein the one or more functions may include operating HHD features, executing HHD applications, or transmitting commands to external items;

translating the specified one or more functions into the one or more executable commands that are executable by HHDs, wherein the one or more executable commands are read by HHDs and executed by HHDs to cause HHDs to perform the specified one or more functions when HHDs passes near the RFID media; and transmitting and storing the one or more executable commands on the RFID media; and a RFID reader that transmits the one or more executable commands to the RFID media for storage on the RFID media.

* * * * *

UNITED STATES PATENT AND TRADEMARK OFFICE
CERTIFICATE OF CORRECTION

| | | |
|---|---|---|
| PATENT NO. | : 8,395,486 B2 | Page 1 of 1 |
| APPLICATION NO. | : 13/239685 | |
| DATED | : March 12, 2013 | |
| INVENTOR(S) | : Ali M. Sajadi | |

It is certified that error appears in the above-identified patent and that said Letters Patent is hereby corrected as shown below:

In the Claims:

Column 20 after Claim 28 add:

29. The method of claim 20 wherein the one or more functions may include the HHD issuing a command or instruction to an external device.

30. The method of claim 21 wherein the one or more functions may include the HHD issuing a command or instruction to an external device.

31. The method of claim 29 wherein the external device to which the HHD issues a command or instruction is an external computing device.

Signed and Sealed this
Fourteenth Day of May, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,395,486 B2
APPLICATION NO. : 13/239685
DATED : March 12, 2013
INVENTOR(S) : Ali M. Sajadi It is certified that error appears in the above-identified patent and that said Letters Patent is hereby corrected as shown below:

Delete the title page and substitute therefore the attached title page showing the corrected number of claims in patent.

In the Claims:

Column 20, line 10, after Claim 28 add:

29. The method of claim 20 wherein the one or more functions may include the HHD issuing a command or instruction to an external device.

30. The method of claim 21 wherein the one or more functions may include the HHD issuing a command or instruction to an external device.

31. The method of claim 29 wherein the external device to which the HHD issues a command or instruction is an external computing device.

This certificate supersedes the Certificate of Correction issued May 14, 2013.

Signed and Sealed this
Eleventh Day of June, 2013

Teresa Stanek Rea
*Acting Director of the United States Patent and Trademark Office*

CERTIFICATE OF CORRECTION (continued)

(12) United States Patent
Sajadi et al.

(10) Patent No.: US 8,395,486 B2
(45) Date of Patent: Mar. 12, 2013

(54) SYSTEM AND METHOD FOR INTERACTIVE USER-DIRECTED INTERFACING BETWEEN HANDHELD DEVICES AND RFID MEDIA

(75) Inventors: Ali M. Sajadi, Washington, DC (US); Mohamad Reza M. Sajadi, Hunt Valley, MD (US); David Carrott, Bristow, VA (US)

(73) Assignee: Q Street, LLC, Washington, DC (US)

( * ) Notice: Subject to any disclaimer, the term of this patent is extended or adjusted under 35 U.S.C. 154(b) by 0 days.

(21) Appl. No.: 13/239,685

(22) Filed: Sep. 22, 2011

(65) Prior Publication Data
US 2012/0050018 A1 Mar. 1, 2012

Related U.S. Application Data

(63) Continuation of application No. 12/901,430, filed on Oct. 8, 2010, now Pat. No. 8,068,011.

(51) Int. Cl.
H04Q 5/22 (2006.01)

(52) U.S. Cl. .......... 340/10.4; 340/572.4; 340/13.26

(58) Field of Classification Search .......... 340/10.1, 340/572.1, 5.93, 10.4, 572.4, 13.26
See application file for complete search history.

(56) References Cited

U.S. PATENT DOCUMENTS

| | | | |
|---|---|---|---|
| 4,688,026 A * | 8/1987 | Scribner et al. | 235/385 |
| 5,628,204 A | 5/1997 | Shanaberger | |
| 5,732,401 A | 3/1998 | Conway | |
| 5,837,983 A | 11/1998 | Actis et al. | |
| 5,886,634 A * | 3/1999 | Muhme | 340/572.1 |
| 5,938,726 A * | 8/1999 | Reber et al. | 709/217 |
| 6,285,282 B1 * | 9/2001 | Dorenbosch et al. | 340/540 |
| 6,297,727 B1 | 10/2001 | Nelson, Jr. | |
| 6,327,576 B1 * | 12/2001 | Ogasawara | 705/22 |
| 6,545,614 B1 | 4/2003 | Kasai | |
| 6,563,430 B1 | 5/2003 | Kemink | |
| 6,609,656 B1 * | 8/2003 | Elledge | 235/382 |
| 6,671,646 B2 * | 12/2003 | Manegold et al. | 702/127 |
| 6,677,852 B1 * | 1/2004 | Landt | 340/10.1 |
| 6,693,539 B2 * | 2/2004 | Bowers et al. | 340/572.1 |
| 6,783,060 B2 | 8/2004 | Marappan | |
| 6,993,393 B2 | 1/2006 | Von Arx et al. | |
| 7,047,159 B2 | 5/2006 | Muehl et al. | |
| 7,060,030 B2 | 6/2006 | Von Arx et al. | |
| 7,076,255 B2 | 7/2006 | Parupudi et al. | |
| 7,119,659 B2 | 10/2006 | Bonalle et al. | |
| 7,128,274 B2 | 10/2006 | Kelley et al. | |
| 7,155,305 B2 | 12/2006 | Hayes et al. | |
| 7,172,112 B2 | 2/2007 | Bonalle et al. | |
| 7,178,729 B2 * | 2/2007 | Shaffer et al. | 235/385 |
| 7,180,422 B2 | 2/2007 | Milenkovic et al. | |

(Continued)

FOREIGN PATENT DOCUMENTS

| | | |
|---|---|---|
| EA | 1575183 A1 | 9/2005 |
| EP | 1314299 B1 | 11/2004 |

(Continued)

Primary Examiner — Jennifer Mehmood
Assistant Examiner — Rufus Point
(74) Attorney, Agent, or Firm — Andrews Kurth LLP

(57) ABSTRACT

Systems and methods for interactively interfacing handheld devices and RFID media are described. A method for interactively interfacing HHDs and RFID media. The method includes starting an application on a HHD for interfacing with RFID media, the HHD including a RFID reader, receiving user input relating to the storing of commands or messages or RFID media, creating one or more commands or messages based on the received user input, and storing the one or more commands or messages on a RFID media using the RFID reader.

31 Claims, 5 Drawing Sheets